June 6, 1967 R. H. CHAPMAN ETAL 3,324,408

ELECTRONIC SIREN INCLUDING A SHOCK EXCITED RESONANT CIRCUIT

Filed Nov. 23, 1965

INVENTORS
CHARLES W. STEPHENS
RONALD H. CHAPMAN.

BY

Mueller Aichele and Rauner
ATTYS.

1

3,324,408

ELECTRONIC SIREN INCLUDING A SHOCK EXCITED RESONANT CIRCUIT

Ronald H. Chapman, Wheaton, Ill., and Charles W. Stephens, Huntington, Ind., assignors to Motorola, Inc., Franklin Park, Ill., a corporation of Illinois Filed Nov. 23, 1965, Ser. No. 509,329
12 Claims. (Cl. 331—47)

The present invention relates generally to electronic sirens for police vehicles, ambulances, and the like, and more particularly to an electronic siren operable to produce an audible output which closely simulates the sound produced by mechanical sirens.

Electronic sirens are in use today on the above named emergency vehicles and these sirens have been designed to overcome inherent operational disadvantages encountered in the use of mechanical sirens. These electronic sirens have the advantage that they are adapted to function with known electronic transmitting and receiving systems on these vehicles. However, users of known electronic sirens have found that the audible output of these sirens sounds strange and in some cases unrecognizable as a siren when compared to the sound produced by the known mechanical sirens or coasters as they are often called.

Accordingly, it is an object of the present invention to provide an electronic siren uniquely adapted to function with known transmitting and receiving systems and at the same time operable to produce an audible output which closely simulates that of a mechanical siren.

It is another object of the invention to provide a siren of the type described of simple and inexpensive construction and which may be designed using a minimum number of standard electronic components.

A feature of the present invention is the provision of an electronic siren having a blocking oscillator, the frequency of which is carefully controlled to produce intermittent pulses for driving a novel, shock excited ringing circuit.

Another feature of the invention is the provision of a uniquely designed ringing amplifier for coupling the output of the blocking oscillator to the ringing circuit to provide a driving signal for shock exciting the ringing circuit and for producing a damped sinusoidal wave which closely simulates the output waveform of a mechanical siren.

Another feature of the invention is the provision of a variable frequency control oscillator for driving the blocking oscillator and an integrating network for coupling the output of the control oscillator to the input of the blocking oscillator.

Figure 1:
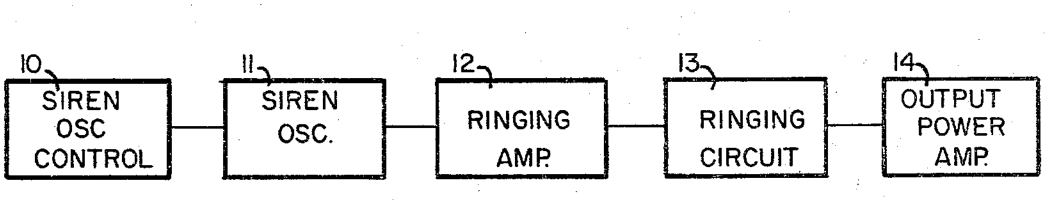
Figure 2:
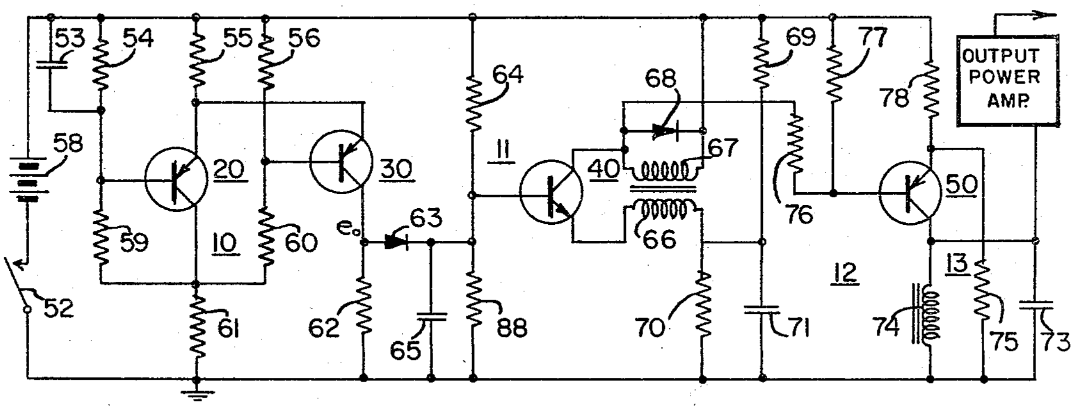

These and other objects and features of the invention will become more fully apparent in the following detailed description of the annexed drawing wherein:

FIG. 1 is a block diagram representation of the electronic siren according to the present invention; and FIG. 2 is a schematic diagram of one embodiment of the present invention represented in FIG. 1.

Briefly described, the electronic siren of the present invention includes a blocking oscillator, the input of which is connected to a control oscillator which generates a low frequency signal for varying the bias on the blocking oscillator to cause a variation in the pulse recurrence frequency thereof. A ringing circuit consisting of a parallel connected inductance-capacitance tank is coupled through a ringing amplifier to the output of the blocking oscillator, and the tank circuit is shock excited by the amplified varying frequency signal bursts from the blocking oscillator. As the level of the output signal of the control oscillator continuously rises and falls, the pulse recurrence frequency of the blocking oscillator is varied accordingly. A continuous increasing and decreasing of the pulse recurrence frequency of the blocking oscillator causes a respective increase and decrease in the excitation frequency of the ringing circuit. This continuously varied excitation frequency of the ringing circuit produces a series of damped sinusoidal oscillations in the tank circuit, which, when amplified and passed through a loudspeaker, closely simulates the sound produced by a mechanical siren or coaster.

2

Referring now to FIG. 1 of the drawings, there is shown a siren control oscillator 10 connected to a siren blocking oscillator 11 for varying the pulse recurrence frequency of the blocking oscillator. A ringing amplifier 12 is connected to the output of the blocking oscillator 11 for amplifying the variable frequency bursts at the output of the blocking oscillator 11 and for applying these bursts to the ringing circuit 13. An output power amplifier 14 is connected to the output of the ringing circuit 13 to amplify the damped sinusoidal signal from the output of the shock excited ringing circuit 13, and thus provide an output signal having a waveform which closely simulates the output waveform of a mechanical siren. The block diagram of FIG. 1 is a representation of the major sections of the schematic diagram of FIG. 2. Any additional coupling circuitry in FIG. 2 not represented in FIG. 1 will be described in detail hereinafter.

*Description and operation of FIG. 2*

The circuit of FIG. 2 illustrates one of many ways in which the arrangement in FIG. 1 may be implemented. FIG. 2 schematically shows a control oscillator including transistor devices 20 and 30 connected in a Schmitt trigger configuration across a voltage supply 58. Bias resistors 54 and 56 are connected respectively in the base circuits of transistors 20 and 30 and the emitters of transistors 20 and 30 are both connected to a common resistor 55 as shown. Resistors 59 and 60 are connected respectively between the bases of transistors 20 and 30 and the collector of transistor 20. The collector of 20 is connected to the supply voltage through resistor 61, and the entire biasing arrangement for the control oscillator 10, including the RC connection 53, 54, 59 provides the astable switching action for transistors 20 and 30 which will be described in detail.

When the switch 52 is closed to connect the voltage supply 58 across the oscillator 10, capacitor 53 initially acts as a short circuit to apply a reverse bias to the transistor 20.

At the same time, due to the forward bias applied via resistors 60 and 56 to transistor 30, 30 will be biased into conduction and a positive voltage $e_0$ will appear at the collector of 30. Capacitor 53 will continue to charge until it reaches a value at which a forward bias is applied to transistor 20. This will cause 20 to draw collector current and develop a voltage across resistor 61 tending to cut off 30. The collector current of 20 continues to rise and causes an increase in the positive voltage at the base 30. 30 is eventually driven to cutoff and 20 is driven into full conduction.

When the charge on capacitor 53 has reached a maximum value, it begins to discharge through 54, 59 and the emitter-base junction of 20. The discharging of capacitor 53 causes a reduction in the drive applied to 20, eventually reducing the collector current of 20 and thus decreasing the reverse bias voltage applied to the base of 30. As the collector current of 20 continues to decrease, the base voltage of 30 drops to a value sufficient to again turn on 30 and produce an output voltage $e_0$ across 62 in the collector circuit of 30.

Diode 63 and capacitor 65 which are connected between the output of the control oscillator 10 and the input of the siren blocking oscillator 11 form an integration network having a fast charge time and relatively slow discharge time. The diode 63 has a polarity which enables capacitor 65 to charge rapidly, but presents a high impedance to the discharge of capacitor 65 and thus produces a sawtooth input voltage at the base of the siren oscillator transistor 40 having a fast rise time and a relative slow decay time.

The siren blocking oscillator includes an NPN transistor 40 with an inductive feedback connection, and the pulse recurrence frequency of the siren blocking oscillator 11 increases with the rise in voltage at the base of transistor 40 and decreases with a drop in voltage at the base of transistor 40. Resistors 64, 69, 70 and 88 form a bias network for the blocking oscillator 11, and this bias network maintains the blocking oscillator cut off in the absence of input signals at the control or base electrode of transistor 40.

Current flow is initiated in transistor 40 when the voltage at the base thereof reaches a predetermined value. Once current begins to flow in the collector coil 67, there is induced in winding 66 a voltage which charges capacitor 71 in a direction tending to bias transistor 40 to cut off. Capacitor 71 will continue to charge until it reaches a value sufficient to reverse bias the emitter base junction of transistor 40 non-conducting. With transistor 40 non-conducting, the charge current for capacitor 71 is no longer flowing and capacitor 71 will discharge through resistors 70 and 69 to a value sufficient to enable the blocking oscillator 11 to again conduct. The level of the sawtooth input at the base of transistor 40 determines the pulse recurrence frequency and the power output of the siren blocking oscillaltor.

The diode 68 which is connected in parallel with the collector coil 67 serves to reduce undesirable transients caused by leakage inductance in the feedback windings 66 and 67.

The ringing amplifier 50 is connected through resistor 76 to the collector electrode of the siren blocking oscillator 11 and is biased normally cutoff by the emitter and base resistors 75, 78 and 77. The ringing circuit 13 is connected directly to the collector electrode of the ringing amplifier transistor 50 and consists of capacitor 73 and inductance 74 connected in parallel. When the rectified pulses at the collector of the ringing amplifier 50 are applied to the ringing circuit 13, the ringing circuit is shock excited and produces a series of damped sinusoids having a pulse recurrence frequency proportional to the pulse recurrence frequency output of the blocking oscillator 11. As the frequency of these damped sinusoids continues to increase and decrease in accordance with the blocking oscillator pulse recurrence frequency, the power output from the power amplifier 14 likewise increases and decreases. The amplified pulses from the ringing amplifier 50 must be of sufficient amplitude to shock excite the ringing circuit 13 to a desired level in order to produce a damped sinusoidal output wave which, when further amplified and applied to a loudspeaker, will produce a sound simulating that of a mechanical siren.

The circuit of FIG. 2 has been operated successfully using a ringing circuit having a resonant frequency of approximately 2 kilocycles and a blocking oscillator 11 having a pulse recurrence frequency between 100 cycles and 1000 cycles and preferably between 500 cycles and 1000 cycles.

The following table of values for FIG. 2 is given only by way of illustration and should in no way be construed as limiting the scope of the present invention.

TABLE I

| | | |
|---|---|---|
| Capacitor 53 | microfarads | 40 |
| Resistor 54 | kilohms | 150 |
| Resistor 55 | do | 3.3 |
| Resistor 56 | do | 10 |
| Resistor 59 | do | 150 |
| Resistors 60, 61 | do | 10 |
| Resistor 62 | do | 3.9 |
| Resistor 64 | do | 10 |
| Capacitor 65 | microfarads | 5 |
| Resistor 66 | kilohms | 4.7 |
| Resistor 69 | do | 22 |
| Resistor 88 | do | 4.7 |
| Resistor 70 | ohms | 820 |
| Capacitor 71 | microfarad | 1 |
| Capacitor 73 | do | 0.2 |
| Inductance 74 | millihenries | 90 |
| Resistance 75 | kilohms | 10 |
| Resistor 76 | do | 6.8 |
| Resistor 77 | do | 15 |
| Resistor 78 | do | 3.3 |
| Transistors 20, 30 | | PNP |
| Transistor 40 | | NPN |
| Transistor 50 | | PNP |

Many modifications may be made in the embodiment of FIG. 2 without departing from the scope of the present invention. Both the control and blocking oscillators circuits lend themselves to many modifications which will vary the frequency thereof in order that the rise and fall times of the audible siren sound may be varied. Similarly, the coupling networks in the embodiment of FIG. 2 may likewise be varied to change the shape of the waveform at different points in the circuit. Therefore, it should be understood that the invention is limited only by way of the following appended claims.

We claim:

1. An electronic siren including in combination:

(a) oscillator means having input, output and control electrodes, said oscillator means being responsive to a variation in signal level at said control electrode for producing intermittent pulses at said output electrode having a pulse recurrence frequency proportional to the signal level at said control electrode, (b) control means for applying a slowly varying signal voltage to said control electrode for varying the pulse recurrence frequency of said intermittent pulses at said output electrode, (c) a parallel connected inductance-capacitance ringing circuit, and (d) output circuit means coupled to said output electrode for applying said intermittent pulses to said ringing circuit to shock excite said ringing circuit and produce a damped sinusoidal waveform at the output of said ringing circuit, having a power output and frequency proportional to the pulse recurrence frequency of said oscillator means.

2. The combination according to claim 1 wherein:

(a) said oscillator means is a blocking oscillator, and (b) said output circuit means includes a common emitter buffer amplifier having a high input impedance and a high output impedance with said ringing circuit being connected in parallel with said high output impedance.

3. The combination according to claim 1 wherein:

(a) said oscillator means is a blocking oscillator, and (b) said control means includes a control oscillator having a low frequency output signal for controlling the pulse repetition frequency of said blocking oscillator.

4. The combustion according to claim 3 which further includes integrating circuit means coupled between said blocking oscillator and said control oscillator for converting the output of said control oscillator into a slowly varying sawtooth wave at the control electrode of said blocking oscillator.

5. The combination according to claim 4 wherein said integrating circuit means includes a diode connected in series with said blocking oscillator and a capacitance network connected to said diode and in parallel with said blocking oscillator, said diode being poled to present a low impedance when said capacitance network is charging and a high impedance when said capacitance network is discharging whereby said sawtooth waveform at the control electrode of said blocking oscillator will have a fast rise time and a slow decay time.

6. The circuit according to claim 5 wherein said output circuit means includes a common emitter transistor amplifier biased to pass only unidirectional pulses from said blocking oscillator to said ringing circuit.

7. The circuit according to claim 6 wherein:

(a) said ringing circuit is connected directly to the output of said common emitter transistor and has a resonant frequency of approximately 2 kilocycles, and (b) said blocking oscillator has a pulse recurrence frequency between 100 and 1000 cycles per second.

8. The circuit according to claim 7 wherein:

(a) said blocking oscillator includes a transistor having an inductive coupling between said output and input electrodes thereof to provide a feedback path therein, and (b) a parallel connected resistance-capacitance network connected between said inductive coupling and a voltage supply and charged during regenerative feedback by current flowing in said inductive coupling in a direction tending to reverse bias said transistor in said blocking oscillator.

9. The circuit according to claim 3 wherein said control oscillator includes:

(a) a pair of transistors, each having input, output and control electrodes, said input electrode being connected at a common junction, (b) a biasing network including first and second resistors connected between the control electrode of each transistor respectively and the output electrode of one transistor, a third resistor connected between the output electrode of the other transistor and the point of reference potential, a fourth resistor connected between the output electrode of said one transistor and said point of reference potential, a fifth resistor connected between the input electrode of said one transistor and a voltage supply, a sixth resistor connected between the control electrode of said other transistor and said voltage supply, a parallel resistance-capacitance network connected between the control electrode of said one transistor and said voltage supply, said capacitance in said resistance-capacitance network acting as a short circuit upon the initial application of said supply voltage to bias said one transistor off and said other transistor on, said capacitance being charged upon the application of said supply voltage in a direction tending to bias said one transistor into conduction whereby the current flowing in said output electrode of said transistor will cause a rise in voltage at said collector electrode of said one transistor which, when applied through said second resistor to said other transistor will bias said other transistor cut off whereby when said capacitor discharges said one transistor again becomes biased to cut off and a continuously varying voltage is produced at the output electrode of said other transistor.

10. The circuit according to claim 9 wherein:

(a) said output circuit means is a transistor ringing amplifier having input, output and control electrodes, said control electrode being connected to the output electrode of said blocking oscillator for receiving intermittent pulses therefrom having a variable pulse recurrence frequency, and (b) said ringing circuit being connected to the output electrode of said transistor ringing amplifier.

11. The circuit according to claim 5 wherein:

(a) said control oscillator includes a pair of transistors coupled as a Schmitt trigger circuit, (b) a parallel resistance-capacitance network connected between a pair of electrodes in one of said transistors and to supply voltage for providing astable switching action of said control oscillator and producing a slowly varying output voltage at the output electrode of the other transistor due to the continuous charging and discharging of said resistance-capacitance network.

12. The circuit according to claim 11 wherein:

(a) said output circuit means is a transistorized ringing amplifier having input, output and control electrodes, said control electrode being connected to the output electrode of said blocking oscillator for receiving intermittent pulses therefrom at a variable pulse recurrence frequency, (b) said ringing circuit being connected to the output electrode of said transistorized ringing amplifier and having a resonant frequency of approximately 2 kilocycles, and (c) said blocking oscillator having a pulse recurrence frequency between 500 and 1000 cycles per second.

References Cited

UNITED STATES PATENTS 3,051,944 8/1962 Smith ............ 340—384

OTHER REFERENCES

Kyle: "Electronic Sirens," Electronic World, April 1964, pp. 32, 33.

ROY LAKE, *Primary Examiner.*

S. H. GRIMM, *Assistant Examiner.*